(12) United States Patent
Kagemoto

(10) Patent No.: US 6,691,182 B2
(45) Date of Patent: Feb. 10, 2004

(54) DMA CONTROLLER IN WHICH BUS ACCESS RATIO CAN BE SET

(75) Inventor: Tetsuya Kagemoto, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 480 days.

(21) Appl. No.: 09/822,361

(22) Filed: Apr. 2, 2001

(65) Prior Publication Data

US 2002/0004861 A1 Jan. 10, 2002

(30) Foreign Application Priority Data

Jul. 4, 2000 (JP) ........................... 2000-202126

(51) Int. Cl.[7] .............................................. G06F 13/28
(52) U.S. Cl. ............................................. 710/28; 710/22
(58) Field of Search .......................... 710/22, 26, 28, 710/107, 33

(56) References Cited

U.S. PATENT DOCUMENTS 5,287,486 A * 2/1994 Yamasaki et al. ............ 710/22
5,497,501 A * 3/1996 Kohzono et al. ............ 710/29
5,630,172 A * 5/1997 Ami et al. .................... 710/25
5,640,600 A * 6/1997 Satoh et al. .................. 710/33

FOREIGN PATENT DOCUMENTS

| JP | 9-81500 | 3/1997 |
| JP | 9-293044 | 11/1997 |
| JP | 11-306130 | 11/1999 |

* cited by examiner

Primary Examiner—Kim Huynh
(74) Attorney, Agent, or Firm—McDermott, Will & Emery

(57) ABSTRACT

A DMA controller includes: a bus availability frequency register setting a ratio of a bus access frequency of DMA transfer to a bus access frequency of another bus master; a DMA request detecting portion detecting a DMA request; a bus availability counter counting the bus access frequency in accordance with the ratio set in the bus availability frequency counter; a bus access request controlling portion controlling the bus access request based on the DMA request detected by the DMA request detecting portion and the counted result of the counter; and a DMA controlling portion controlling execution of DMA transfer. Thus, a band which allows another bus master to use a bus during DMA transfer can be predicted.

18 Claims, 15 Drawing Sheets

DMA CONTROLLER IN WHICH BUS ACCESS RATIO CAN BE SET

BACKGROUND OF THE INVENTION

1. Field of the Invention

The present invention relates to a DMA (Direct Memory Access) controller performing controls such as direct data transfer between memories not through a CPU (Central Processing Unit). More particularly, the present invention relates to a DMA controller in which a bus access ratio can be set.

2. Description of the Background Art

Recently, as a greater number of information processing apparatuses such as personal computers are used, these apparatuses are required to operate at higher processing speed and provide greater functionality. Examples of features for increasing the processing speed of such information processing apparatuses include DMA that provides for direct data transfer between memories not through a CPU. The structure and operation of a conventional DMA controller will be described in the following.

Structure of conventional DMA Controller

FIG. 1 is a block diagram showing a general structure of a conventional DMA controller. The DMA controller includes: a source address register 10 storing a source address for DMA; a destination address register 11 storing a destination address for DMA; a DMA transfer counter 12 storing a number of transfers of DMA; a DMA request selecting register 13 selecting a request signal for DMA; a DMA controlling portion 50 accessing an external memory (not shown) for DMA transfer; a DMA request detecting portion 60 detecting an externally applied DMA request in accordance with the settings of DMA request selecting register 13; and a bus access request controlling portion 70 requesting a bus arbiter (not shown) a permission to use a bus in response to the bus access request from DMA controlling portion 50.

Signals 100 to 104 shown on the left side of the DMA controller are used by an external bus master such as a CPU in accessing source address register 10, destination address register 11, DMA transfer counter 12 or DMA request selecting register 13. These signals are: a chip select (CS) signal 100 indicating as to if access is valid; 32 address (ADDR) signals 101 selecting a register to be accessed; a read/write control (R/W) signal 102 indicating if the access is read or write access; 32 write data (WDATA) signals 103 transferring data for write access; and 32 read data (RDATA) signals 104 transferring data for read access.

Signals 110 to 114 shown on the right side of the DMA controller are used by DMA controlling portion 50 in accessing the external memory (not shown). These signals are: 32 address (ADDR) signals 110 selecting a region to be accessed; a read/write control (R/W) signal 111 indicating if access is read or write access; 32 write data (WDATA) signals 112 transferring data for write access; 32 read data (RDATA) signals 113 transferring data for read access; and a ready (READY) signal 114 indicating the completion of bus access.

Other signals used are: a DMA request (DMAREQ) signal 120 accepting an externally applied DMA request; a bus access request (BUSREQ) signal 130 to the bus arbiter (not shown); a bus access granting (BUSGNT) signal 131 from the bus arbiter; and a clock (CLK) signal 150 generally used for a system.

DMA request detecting portion 60 detects the rise of a signal selected by DMA request selecting register 13 among 32 DMAREQ signals 120 and stores in an internal register (not shown) the fact that there is a DMA request from an external portion. DMA request detecting portion 60 outputs a DMA request (dmrq) to DMA controlling portion 50 when the internal register is set. DMA request detecting portion 60 resets the above mentioned internal register when a DMA acknowledgement (dmack) is output from DMA controlling portion 50. Bus access request controlling portion 70 asserts BUSREQ signal 130 when a DMA enable (dmen) signal is output from DMA controlling portion 50.

FIG. 2 is a block diagram used for describing in greater detail the structure of DMA controlling portion 50. DMA controlling portion 50 includes: a source address counter 251 of a 32-bit counter calculating a source address; a destination address counter 252 of a 32-bit counter calculating a destination address; a transfer counter 253 of a 16-bit counter for calculating a transferred data amount; a state machine (FSM) 254 generating and outputting a control signal depending on the state of data transfer by DMA; an address generating portion 255 generating and outputting an ADDR signal 110 based on outputs from source address counter 251 and destination address counter 252; and a write data generating portion 256 generating and outputting a WDATA signal 112.

FSM 254 generates and outputs a DMA acknowledgement (dmack) signal, destination address setting (saset) signal, read completion (rdcmp) signal, DMA enable (dmen) signal, write completion (wrcmp) signal and RIW signal 111. FSM 254 will later be described in greater detail.

When dmack is asserted, a value (sa) that has been set in source address register 10 is set in source address counter 251. When rdcmp is asserted, the value of source address counter 251 is increased by 4, but the current value is maintained in other cycles.

When dmack is asserted, a value (da) that has been set in destination address counter 11 is set in destination address counter 252. When wrcmp is asserted, the value of destination address counter 252 is increased by 4, but the current value is maintained in other cycles.

When dmack is asserted, a value (tr) that has been set in DMA transfer counter 12 is set in transfer counter 253. When wrcmp is asserted, the value of transfer counter 253 is decreased by 1, but the current value is maintained in other cycles.

FIG. 3 is a block diagram used for describing the structure of write data generating portion 256 in greater detail. Write data generating portion 256 includes selectors 301 and 302, flip-flops 303 and 304, and an AND circuit 305. Note that selector 302 and flip-flop 304 both have a 32-bit width.

When READY is asserted, selector 301 selects and outputs rdcmp. At the time, if rdcmp is asserted, flip-flop 303 holds and outputs "H" at the rise of a CLK signal. When READY is asserted next time, AND circuit 305 outputs "H" and selector 302 selects and outputs the value of RDATA 113. Flip-flop 304 holds the value of RDATA 113 at the rise of CLK for outputting it as WDATA 112.

FIG. 4 is a diagram showing state transitions of FSM 254. Circles represent states, whereas arrows represent state transitions. Transition conditions are shown next to the arrows representing the state transitions. If none of the transition conditions is met, FSM 254 is maintained in the current state. FSM 254 is initially set in an IDLE state. Note that, in the state transition diagram, "&," "|," and "!" respectively represent a logical product, logical addition and negation.

Outputs from FSM 254 are a dmen signal, dmack signal, saset signal, R/W signal 111, rdcmp signal, and wrcmp signal. The dmen signal is negated in the IDLE state, and asserted in all the other states. The dmack signal is asserted only in transition from the idle state to a BUSREQ1 state, and negated in all other states. The saset signal is asserted only in transition from the BUSREQ1 state to an RD state, and negated in all the other states. R/W 111 indicates write in WR state, and read in all the other states. The rdcmp signal is asserted only in transition from the RD state to a BUSREQ2 state or WR state, and negated in all the other states. The wrcmp is asserted only in transition from the WR state to the IDLE state, BUSREQ1 state or RD state, and negated in all the other states.

Operation of Conventional DMA Controller (1) Settings of DMA

DMA is set when an external CPU writes values to internal registers (source address register 10, destination address register 11, DMA transfer counter 12 and DMA request selecting register 13 of the DMA controller).

FIG. 5 is a timing chart when the external CPU writes values to the internal registers of the DMA controller. At the rise of CLK signal 150 in a cycle 1, the internal register captures a value of ADDR signal 101 upon detection of a fact that CS signal 100 and R/W signal 102 are respectively at "H" and "L." Based on a decoded result of ADDR signal 101, it is determined which register is to be accessed. Then, at the rise of CLK signal 150 in a cycle 2, a value of WDATA signal 112 is written to the register selected by the captured address.

Source and destination addresses for DMA are respectively set in source address register 10 and destination address register 11, and a transfer frequency of data transferred by DMA is set in DMA transfer counter 12. Further, bits of DMA request selecting register 13 respectively correspond to 32 DMAREQ signals 120, and "1" is set to the bit corresponding to the signal starting DMA.

(2) Start of DMA

DMA transfer is started when DMA request detecting portion 60 asserts dmrq at the rise of the signal corresponding to the bit of DMA request selecting register 13 in which "1" is set among DMA request signals 120.

(3) Execution of DMA

When DMA request detecting portion 60 asserts dmrq, DMA controlling portion 50 executes DMA transfer. FIG. 6 is a timing chart during DMA transfer. The states and outputs of the FSM in each cycle are denoted below the timing chart. Note that "0×0" is set in source address register 10, "0×100" set in destination address register 11, and "0×10" in DMA transfer counter 12.

A cycle 0 corresponds to the IDLE state. When DMA request detecting portion 60 asserts dmrq in cycle 0, FSM 254 asserts dmack and is brought into the BUSREQ1 state. At the time, the values of source address register 10 and destination address register 11 are respectively set in source address counter 251 and destination address counter 252, and the value of DMA transfer counter 12 is set in transfer counter 253.

Since FSM 254 is brought into the state other than the IDLE state after cycle 1, it asserts dmen. In cycle 1 (BUSREQ1 state), FSM 254 asserts dmen, whereby bus access request controlling portion 70 asserts BUSREQ signal 130. In cycle 2 (BUSREQ1 state), BUSGNT and READY signals are asserted, so that FSM 254 is brought into the RD state. At the time, FSM 254 asserts saset. Address generating portion 255 detects a fact that saset has been asserted for outputting the value (0×0) of source address counter 251 to ADDR signal 110.

In a cycle 3 (RD state), FSM 254 is brought into the WR state since BUSGNT and READY signals are asserted. At the time, FSM 254 asserts rdcmp, so that the value of source address counter 251 is increased by 4. Address generating portion 255 detects a fact that rdcmp has been asserted for outputting the value (0×100) of source address counter 252 to ADDR signal 110.

In a cycle 4 (WR state), FSM 254 sets R/W signal 111 in a writing state. In a cycle 5 (WR state), BUSGNT and READY signals are asserted and the value of a transfer counter 253 is "0×10," so that FSM 254 is brought into the RD state. At the time, FSM 254 asserts wrcmp, so that the value of transfer address counter 252 is increased by 4 and that of transfer counter 253 is decreased by 1. Address generating portion 255 detects a fact that wrcmp has been asserted for outputting the value (0×4) to ADDR signal 110. Write data generating portion 256 captures the value of RDATA signal 113 for outputting it to WDATA signal 112.

In and following a cycle 6, FSM 254 repeats the operation similar to that in cycles 3 to 5, in which FSM 254 is brought into the IDLE state and negates dmen when BUSGNT and READY are asserted and the value of transfer counter 253 is "0×1." Bus access request controlling portion 70 detects a fact that dmen has been negated, negates BUSREQ signal 130, and ends DMA transfer.

In the above described conventional DMA controller, however, a ratio of a bus access frequency of the DMA controller in the process of DMA transfer to a bus access frequency of another bus master such as a CPU cannot be controlled. Therefore, it is difficult to predict a band which allows another bus master to use the bus during DMA transfer. Further, a smooth process by another bus master may not be achieved due to DMA transfer with less urgency, or another bus master frequently accesses during DMA transfer with urgency. As a result, a problem arises which is associated with a loss of transfer data or degradation of the performance of the system as a whole.

SUMMARY OF THE INVENTION

An object of the present invention is to provide a DMA controller capable of predicting a band which allows another bus master to use a bus during DMA transfer.

Another object of the present invention is to provide a DMA controller capable of avoiding degradation of the performance of a system as a whole.

According to one aspect of the present invention, the DMA controller includes: a register for setting a ratio of a bus access frequency of DMA transfer to a bus access frequency of another bus master; a DMA request detecting portion detecting a DMA request; a counter counting the bus access frequency in accordance with the ratio set in the register; a bus access request controlling portion controlling a bus access request based on the DMA request detected by the DMA request detecting portion and the counted result of the counter; and a DMA controlling portion controlling DMA transfer in accordance with a bus access permission.

The bus access request controlling portion controls the bus access request based on the DMA request detected by the DMA request detecting portion and the counted result of the counter. Thus, the ratio of the bus access frequency of DMA transfer to the bus access frequency of another bus master equals to the ratio set in the register, whereby a band which allows another bus master to use a bus during DMA transfer can be predicted. Further, the values set in the register can be appropriately varied depending upon the urgency of the DMA transfer, so that degradation of the performance of a system as a whole would not occur.

According to another aspect of the present invention, the DMA transfer method includes steps of: setting a ratio of a bus access frequency of DMA transfer to a bus access frequency of another bus master; detecting a DMA request; counting the bus access frequency in accordance with the set ratio; controlling a bus access request based on the detected DMA request and the counted result; and controlling DMA transfer in accordance with a bus access permission.

The bus access request is controlled based on the detected DMA request and the counted result. Thus, the ratio of the bus access frequency of DMA transfer to the bus access frequency of another bus master can equal to the ratio set in the register. Accordingly, a band which allows another bus master to use the bus during DMA transfer can be predicted. In addition, the value set in the register can be appropriately varied depending upon the urgency of DMA transfer, so that degradation of the performance of a system as a whole would not occur.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Structure of DMA Controller

Figure 7:
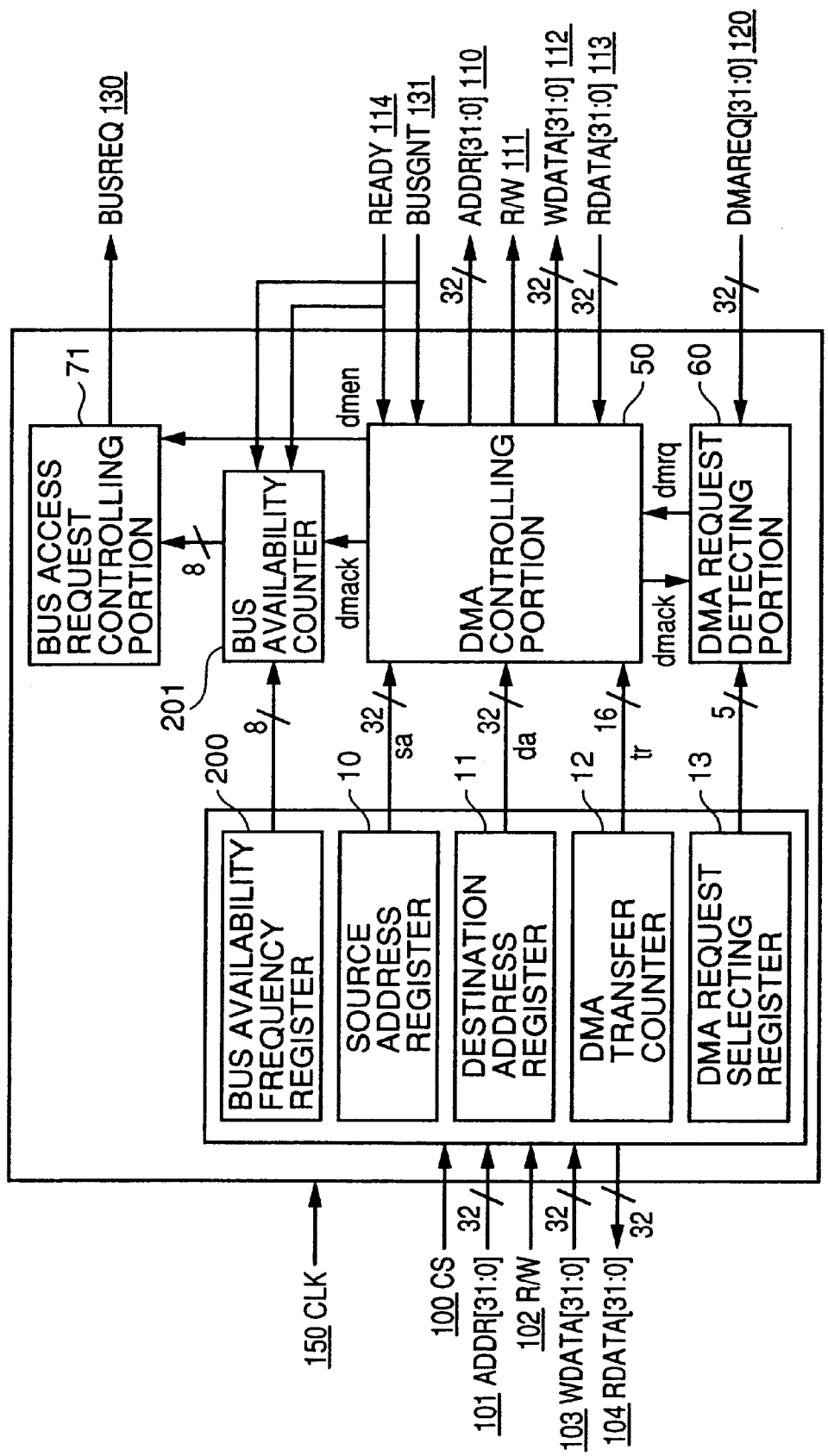
FIG. 7 is a block diagram showing a general structure of a DMA controller according to the first embodiment of the present invention.

FIG. 7 is a block diagram used for describing a general structure of a DMA controller according to the first embodiment of the present invention. The DMA controller includes: a source address register 10 storing a source address for DMA; a destination address register 11 storing a destination address for DMA; a DMA transfer counter 12 storing a byte number of data to be transferred by DMA; a DMA request selecting register 13 selecting a request signal for starting DMA; a DMA controlling portion 50 accessing an external memory (not shown) for executing DMA transfer; a DMA request detecting portion 60 detecting an externally applied DMA request in accordance with the settings of DMA request selecting register 13; a bus access request controlling portion 71 requesting a bus arbiter (not shown) a permission to use a bus in accordance with the bus access request from DMA controlling portion 50; a bus availability frequency register 200 storing a frequency of bus accesses permitted to another bus master when a bus is available; and a bus availability counter 201 counting a frequency of bus accesses by another bus master when the bus is available. Note that the portions denoted by the same reference numerals as for the conventional DMA controller have the same structure and function. Further, input/output signals of the DMA controller are the same as those of the conventional case, and therefore the detailed description thereof will not be repeated.

When dmack is asserted, "0x0" is set in bus availability counter 201. The value of bus availability frequency register 200 is set in bus availability counter 201 when a BUSGNT signal 131 and an READY signal 114 are asserted. A count of bus availability counter 201 is decreased by 1 if the BUSGNT signal 131 is negated, READY signal 114 is asserted and the value of bus availability counter 201 is not "0x0."

Bus access request controlling portion 71 asserts BUS-REQ signal 130 in a cycle when dmen is asserted by DMA controlling portion 50 and the value of bus availability counter 201 is "0x0." In all the other cycles, bus access request controlling portion 71 negates BUSREQ signal 130.

Operation of DMA Controller (1) Settings of DMA

Figure 5:
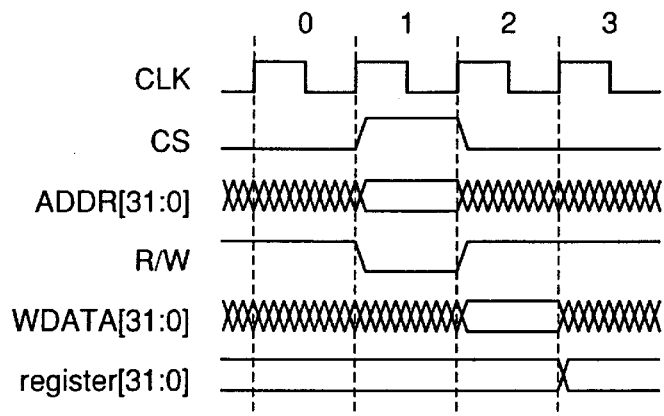
FIG. 5 is a timing chart when an external CPU writes values to internal registers of a DMA controller.
Figure 6:
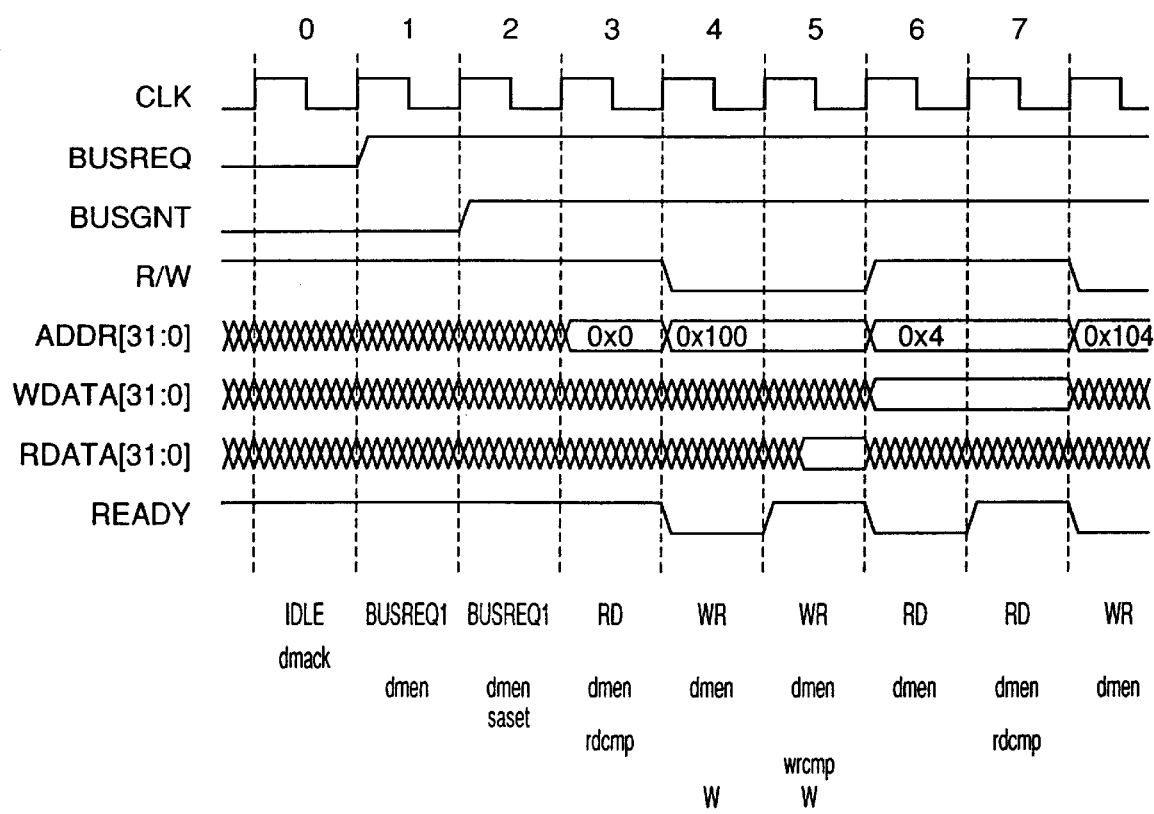
FIG. 6 is a timing chart of a conventional DMA controller.

In addition to the writing operation with respect to source address register 10, destination address register 11, DMA transfer counter 12 and DMA request selecting register 13 in the description of the background art, DMA is set when an external CPU (not shown) writes a value to bus availability frequency register 200. Note that a writing timing with respect to bus availability frequency register 200 is the same as in FIG. 5, and therefore detailed description thereof will not be repeated.

(2) Start of DMA

DMA request detecting portion 60 asserts dmrq at the rise of a signal corresponding to a bit of DMA request selecting register 13 in which "1" is set among DMAREQ signals 120 to start DMA transfer.

(3) Execution of DMA

Figure 8:
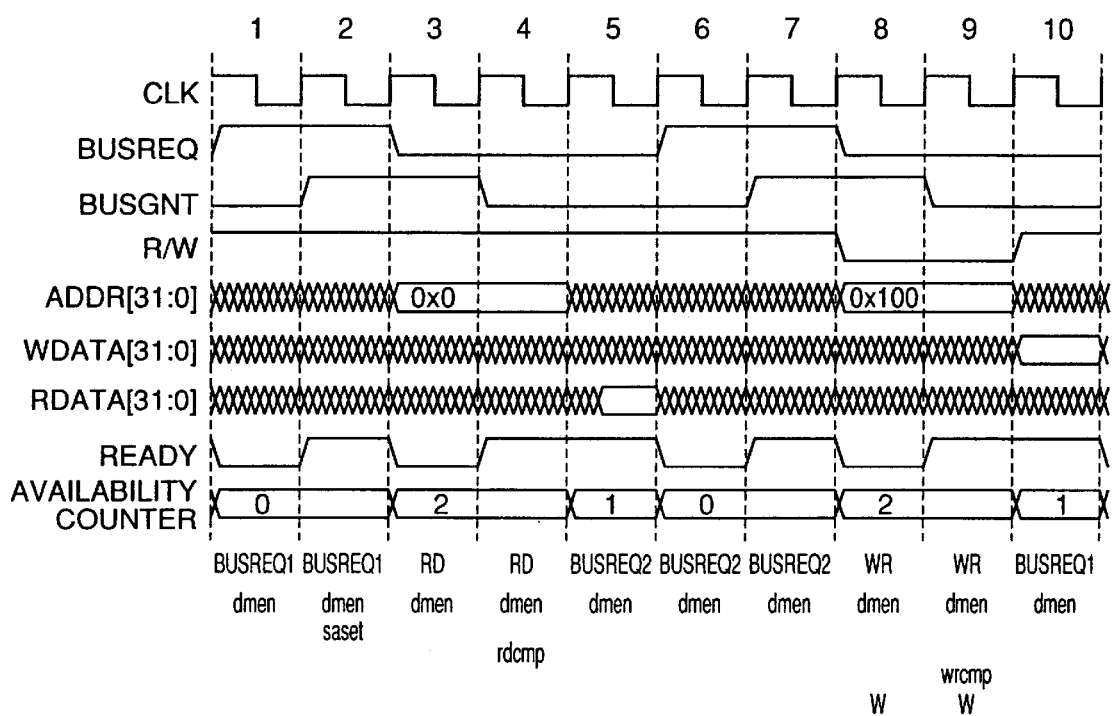
FIG. 8 is a timing chart of a DMA controller according to the first embodiment of the present invention.

When DMA request detecting portion 60 asserts dmrq, DMA controlling portion 50 executes DMA transfer. FIG. 8 is a timing chart of a DMA controller during DMA transfer.

It is noted that "0x0" and "0x100" are respectively set in source address register 10 and destination address register 11, and "2" is set in bus availability frequency register 200.

Although not shown in FIG. 8, a cycle 0 corresponds to the IDLE state as in the conventional case. In cycle 0, DMA request detecting portion 60 asserts dmrq, so that FSM 254 asserts dmack and is brought into the BUSREQ1 state. At the time, the values of source address register 10, destination address register 11 and DMA transfer counter 12 are respectively set in source address counter 251, destination address counter 252 and transfer counter 253, and "0x0" is set in bus availability counter 201.

In a cycle 1 (BUSREQ1 state), FSM 254 asserts dmen. Bus access request controlling portion 71 asserts BUSREQ signal 130 since dmen is asserted and the value of bus availability counter 201 is "0x0." In a cycle 2 (BUSREQ1 state), BUSGNT signal and READY signals are asserted, so that FSM 254 is brought into an RD state. At the time, FSM 254 asserts saset. Address generating portion 255 detects a fact that saset has been asserted for outputting the value (0x0) of source address counter 251 to an ADDR signal 110. Further, the value of bus availability frequency register 200 is set in bus availability counter 201.

In a cycle 3 (RD state), FSM 254 is maintained in the RD state since READY signal is not asserted although BUSGNT signal is asserted. Further, bus access request controlling portion 71 negates BUSREQ signal 130 since bus availability counter 201 has a positive value.

In a cycle 4 (RD state), FSM 254 is brought into the BUSREQ2 state since BUSGNT signal is negated although READY signal is asserted. At the time, the value of bus availability counter 201 is decreased by 1 since it is not "0x0." Further, FSM 254 asserts rdcmp, so that the value of source address counter 251 is increased by 4. Address generating portion 255 detects a fact that rdcmp has been asserted and stops outputting ADDR signal 110. Since BUSGNT signal is negated in cycle 4, another bus master starts bus access from the following cycle 5.

In cycle 5 (BUSREQ2 state), write data generating portion 256 detects a fact that READY has been asserted for capturing the value of RDATA signal 113. At the time, the value of bus availability counter 201 is decreased by 1 since it is not "0x0." Note that the assertion of the READY signal corresponds to bus access by another bus master.

In a cycle 6 (BUSREQ2 state), since dmen is asserted and the value of bus availability counter 201 is "0x0," BUSREQ signal is asserted. In a cycle 7 (BUSREQ2 state), BUSGNT signal and READY signal are asserted, so that FSM 254 is brought into a WR state. At the time, address generating portion 255 outputs the value (0x100) of destination address counter 252 to ADDR signal 110. Further, the value of bus availability frequency register 200 is set in bus availability counter 201.

In a cycle 8 (WR state), FSM 254 sets R/W signal 111 in the writing state. Further, since bus availability counter 201 has a positive value, bus access request controlling portion 71 negates BUSREQ signal 130. In a cycle 9 (WR state), READY signal is asserted and BUSGNT signal is negated, so that FSM 254 is brought into the BUSREQ1 state. At the time, FSM 254 asserts wrcmp, so that the value of destination address counter 252 is increased by 4 and that of transfer counter 253 is decreased by 1. Address generating portion 255 detects a fact that wrcmp has been asserted to stop outputting ADDR signal 110.

In a cycle 10 (BUSREQ1 state), DMA controlling portion 50 outputs data captured in cycle 5 to WDATA112. At the time, the value of bus availability counter 201 is decreased by 1 since it is not "0x0." Note that the assertion of the READY signal corresponds to the bus access by another bus master.

As described above, one bus access by DMA controlling portion 50 corresponds to two bus accesses by another bus master, so that a bus access ratio of DMA controlling portion 50 is ⅓. If N is set in bus availability frequency register 200, the bus access ratio of DMA controlling portion 50 would be 1/(N+1).

Thus, according to the DMA controller of the present embodiment, the ratio of the bus access frequency of DMA controlling portion 50 to the bus access frequency by another bus master can be determined in accordance with the value set in bus availability frequency register 200, whereby a band which allows another bus master to use the bus during DMA transfer can be easily predicted. A higher bus access ratio for DMA transfer with high urgency can prevent a loss of transfer data, so that the performance of a system as a whole can be enhanced.

Second Embodiment

Structure of DMA Controller

Figure 9:
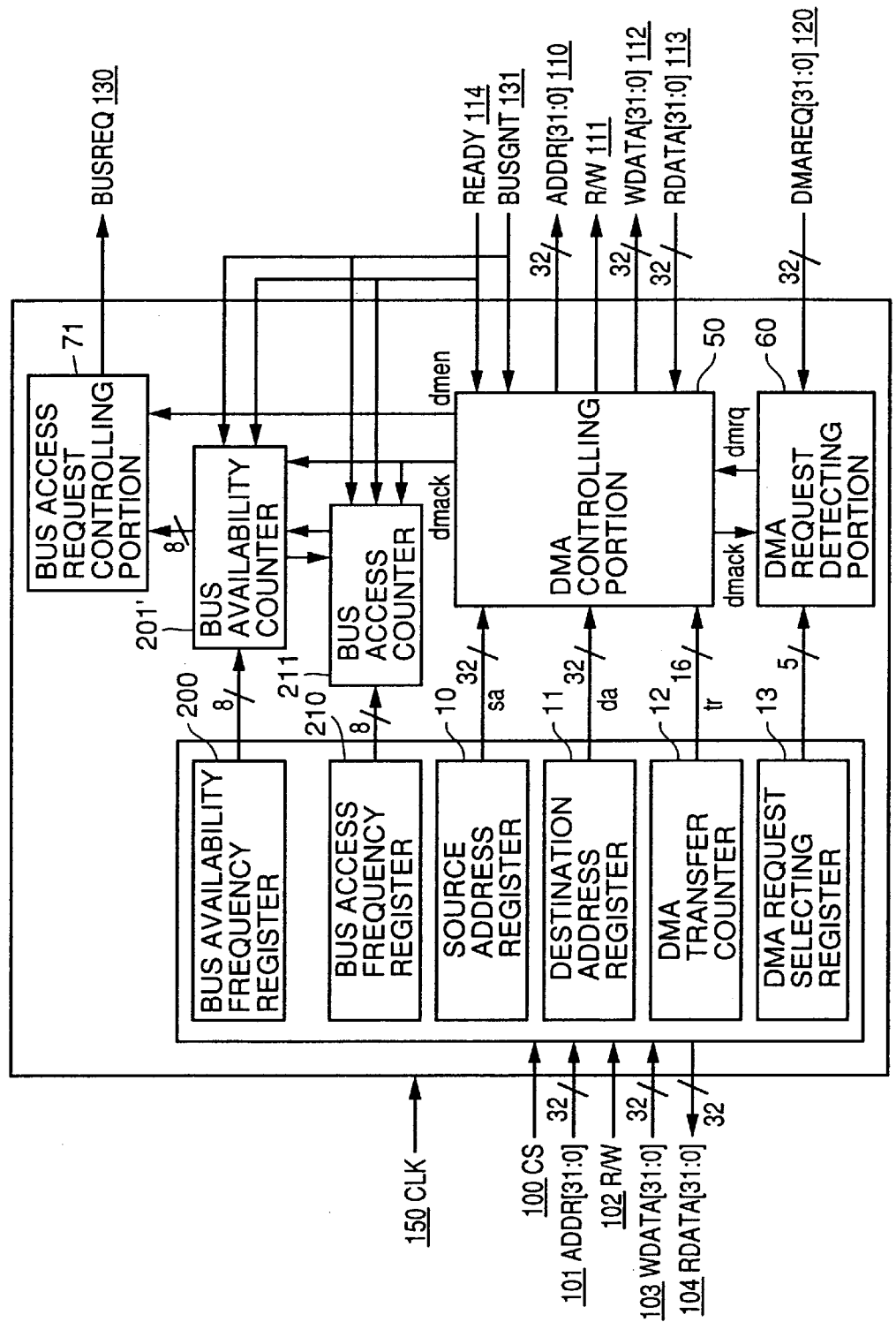
FIG. 9 is a block diagram showing a general structure of a DMA controller according to the second embodiment of the present invention.

FIG. 9 is a block diagram used for describing a general structure of a DMA controller according to the second embodiment of the present invention. The DMA controller is different from that shown in FIG. 7 in that it further includes a bus access frequency register 210 storing a frequency of successive bus accesses by DMA controlling portion 50 permitted during DMA transfer and a bus access counter 211 counting a frequency of successive bus accesses by DMA controlling portion 50. Further the DMA controller of the present embodiment is different from that of FIG. 7 in the function of the bus availability counter. Accordingly, description of the same portions of the structure and function will not be repeated. Note that the bus availability counter is herein denoted by 201'.

When dmack is asserted, "0x0" is set in bus availability counter 201'. When BUSGNT signal 131 and READY signal 114 are asserted and the value of bus access counter 211 is "0x1," the value of bus availability frequency register 200 is set in bus availability counter 201'. When BUSGNT signal 131 is negated, READY signal 114 is asserted, and the value of bus availability counter 201' is not "0x0," the value of bus availability counter 201' is decreased by 1.

When dmack is asserted by DMA controlling portion 50, the value of bus access frequency register 210 is set in bus access counter 211. When BUSGNT signal 131 is negated, READY signal 114 is asserted, and the value of bus availability counter 201' is "0x1," the value of bus access frequency register 210 is set in bus access counter 211. Further, when BUSGNT signal 131 and READY signal 114 are asserted and the value of bus access counter 211 is not "0x0," the value of bus access counter 211 is decreased by 1.

Operation of DMA Controller (1) Settings of DMA

In addition to the writing operation with respect to source address register 10, destination address register 11, DMA transfer counter 12, DMA request selecting register 13 and bus availability frequency register 200 of the first embodiment, the values are written to bus access frequency register 210 by an external CPU (not shown) for setting DMA. It is noted that the writing timing with respect to bus access frequency register 210 is the same as in FIG. 5, and therefore detailed description thereof will not be repeated.

(2) Start of DMA

When DMA request detecting portion 60 asserts dmrq at the rise of a signal corresponding to a bit of DMA request selecting register 13 in which "1" is set among DMAREQ signals 120, DMA transfer is started.

(3) Execution of DMA

Figure 10:
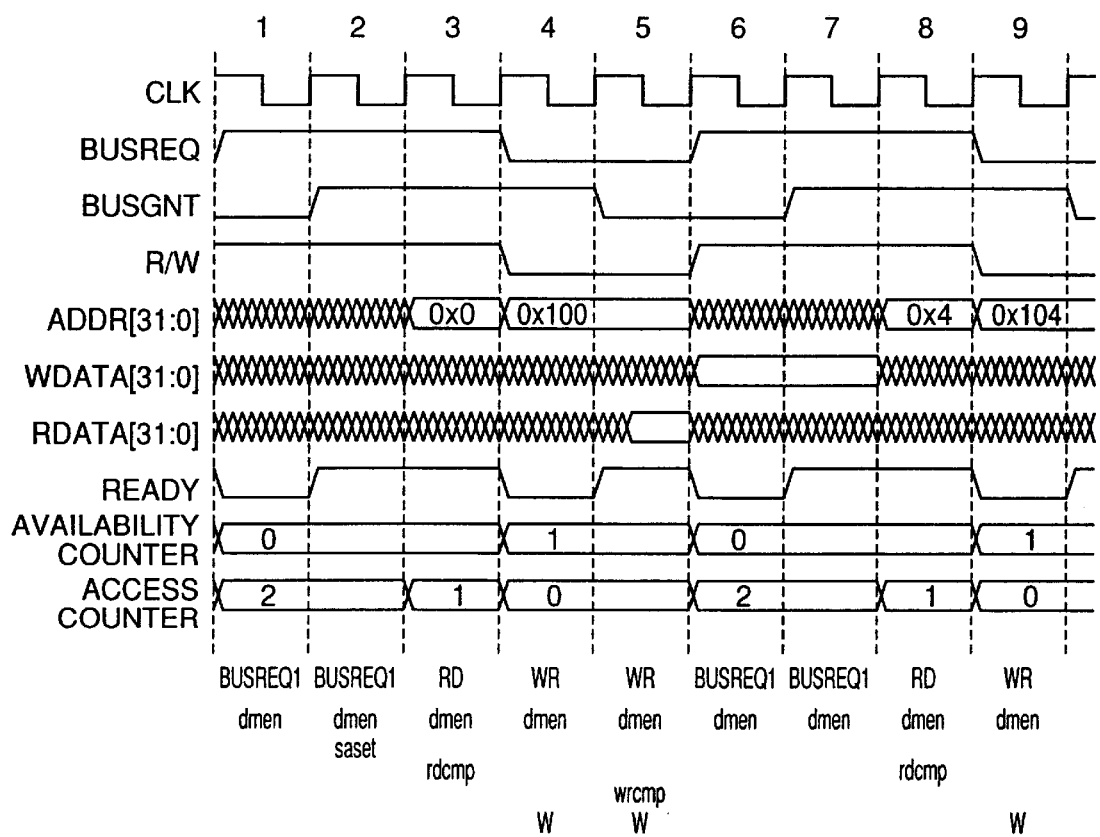
FIG. 10 is a timing chart of a DMA controller according to the second embodiment of the present invention.

When DMA request detecting portion 60 asserts dmrq, DMA controlling portion 50 executes DMA transfer. FIG. 10 is a timing chart of a DMA controller during DMA transfer. Assume that "0x0" is set in source address register 10, "0x100" in destination address register 11, "1" in bus availability frequency register 200 and "2" in bus access frequency register 210.

While not shown in FIG. 10, cycle 0 corresponds to the IDLE state as in the conventional case. In cycle 0, DMA request detecting portion 60 asserts dmrq, so that FSM 254 asserts dmack and is brought into a BUSREQ1 state. At the time, the values of source address register 10, destination address register 11 and DMA transfer counter 12 are respectively set in source address counter 251, destination address counter 252 and transfer counter 253. Further, "0x0" is set in bus availability counter 201', and the value of bus access frequency register 210 is set in bus access counter 211.

In a cycle 1 (BUSREQ1 state), FSM 254 asserts dmen. Since dmen is asserted and the value of bus availability counter 201' is "0x0," bus access request controlling portion 71 asserts BUSREQ signal 130. In a cycle 2 (BUSREQ1 state), BUSGNT signal and READY signal are asserted, so that FSM 254 is brought into an RD state. At the time, FSM 254 asserts saset. Address generating portion 255 detects a fact that saset has been asserted for outputting the value (0x0) of destination address counter 251 to ADDR signal 110. In addition, the value of bus access counter 211 is decreased by 1.

In a cycle 3 (RD state), since BUSGNT signal and READY signal are asserted, FSM 254 is brought into a WR state. The value of bus access counter 211 is "0x1," so that the value of bus availability frequency register 200 is set in bus availability counter 201'. The value of bus access counter 211 is decreased by 1. Since bus availability counter 201' has a positive value, bus access request controlling portion 71 negates BUSREQ signal 130. Address generating portion 255 detects a fact that rdcmp has been asserted for outputting the value (0x100) of destination address counter 252 to ADDR signal 110.

In a cycle 4 (WR state), FSM 254 sets an R/W signal 111 in the writing state. Further, in a cycle 5, (WR state), READY signal is asserted and BUSGNT signal is negated, so that FSM 254 is brought into a BUSREQ1 state. At the time, FSM 254 asserts wrcmp, so that the value of destination address counter 252 is increased by 4 and that of transfer counter 253 is decreased by 1. Write data generating portion 256 captures the value of RDATA signal 113. Then, address generating portion 255 detects a fact that wrcmp has been asserted and stops outputting ADDR signal 110. The value of bus availability counter 201' is decreased by 1, and the value of bus access frequency register 210 is set in bus access counter 211.

In a cycle 6 (BUSREQ1 state), the value of bus availability counter 201' is "0x0," so that BUSREQ signal is asserted. Further, write data generating portion 255 outputs data captured in cycle 5 to WDATA signal 112.

In a cycle 7 (BUSREQ1 state), READY signal and BUSGNT signal are asserted, so that FSM 254 is brought into the RD state. At the time, since bus access counter 211 does not have a value of "0x0," the value of bus access counter 211 is decreased by 1.

In a cycle 8 (RD state), since READY signal and BUSGNT signal are asserted, FSM 254 is brought into the WR state. At the time, the value of bus availability frequency register 200 is set in bus availability counter 201' and the value of bus access counter 211 is decreased by 1. In a cycle 9 (WR state), FSM 254 sets R/W signal 111 in the writing state.

Thus, two bus accesses by DMA controlling portion 50 correspond to one bus access by another bus master, providing a bus access ratio of DMA controlling portion 50 of ⅔. If M and N are respectively set in bus access frequency register 210 and bus availability frequency register 200, the bus access ratio of DMA controlling portion 50 would be M/(M+N).

As described above, according to the DMA controller of the present embodiment, a ratio of the bus access frequency of DMA controlling portion 50 to the bus access frequency of another bus master can be determined in accordance with the values set in bus availability frequency register 200 and bus access frequency register 210, a band which allows another bus master to use the bus during DMA transfer can be easily predicted. In addition, the higher bus access ratio for DMA transfer with high urgency can prevent a loss of transfer data, whereby the performance of a system as a whole can be enhanced.

Third Embodiment

Structure of DMA Controller

Figure 11:
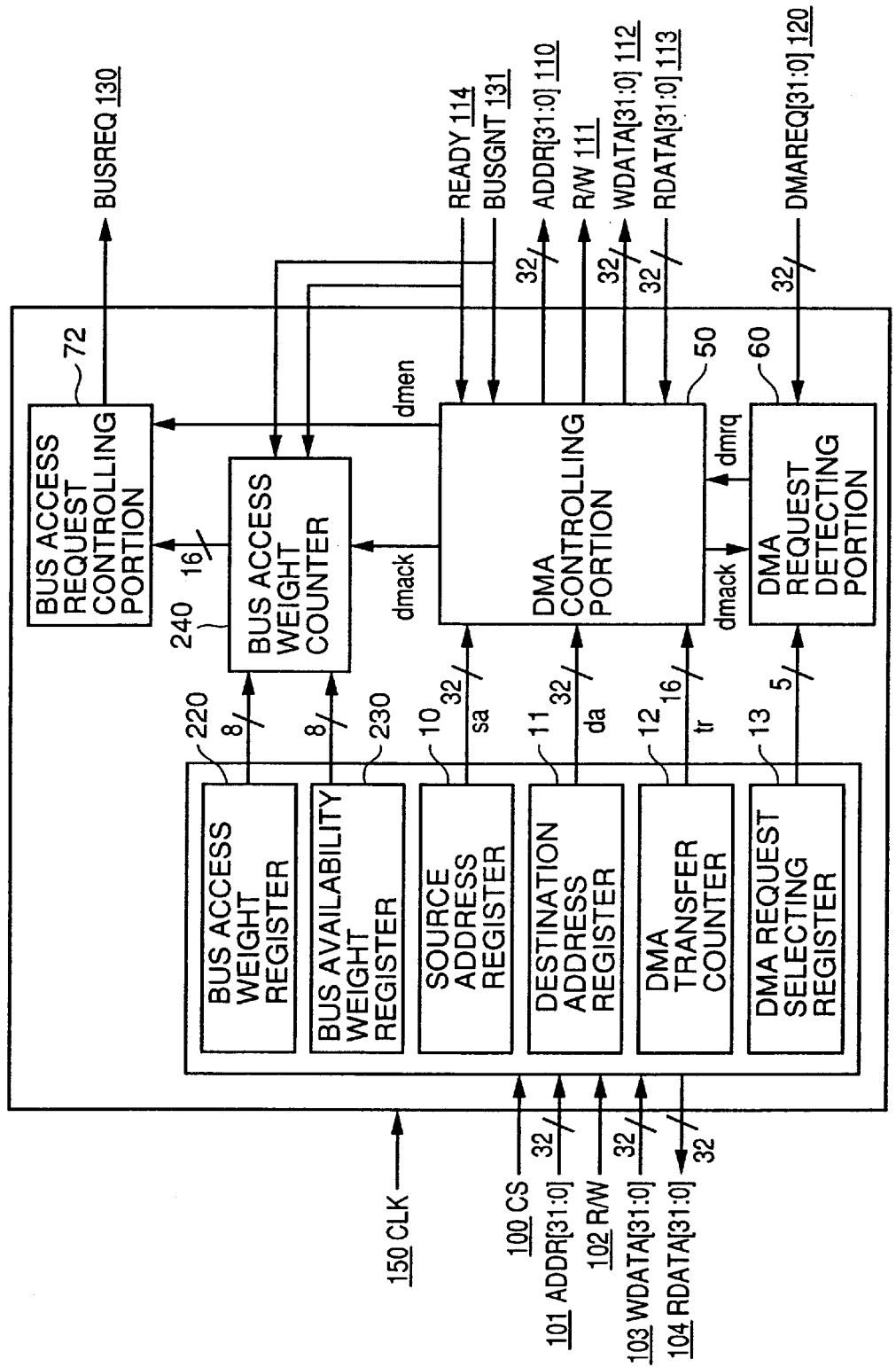
FIG. 11 is a block diagram showing a general structure of a DMA controller according to the third embodiment of the present invention.

FIG. 11 is a block diagram used for describing a general structure of a DMA controller according to the third embodiment of the present invention. The DMA controller of the present embodiment is different from that of the first embodiment shown in FIG. 7 in that bus availability frequency register 200 is replaced by bus access weight register 220 and a bus availability weight register 230 and that bus availability counter 201 is replaced by bus access weight counter 240. Further, the DMA controller of the present embodiment is different from that of the first embodiment in the function of the bus access request controlling portion. Accordingly, description of the overlapping portions of the structure and function will not be repeated. Note that the bus access request controlling portion is denoted by a reference numeral 72.

When dmack is asserted by DMA controlling portion 50, "0x0" is set in bus access weight counter 240. When BUSGNT and READY signal 114 are asserted, the value of bus access weight register 220 is subtracted from the value of bus access weight counter 240. When BUSGNT signal 131 is negated and READY signal 114 is asserted, the value of bus availability weight register 230 is added to the value of bus access weight counter 240.

Bus access request controlling portion 72 asserts BUSREQ signal 130 in a cycle in which dmen is asserted by DMA controlling portion 50 and the value of bus access weight counter 240 is at least 0. In all the other cycles, bus access request controlling portion 72 negates BUSREQ signal 130.

Operation of DMA Controller (1) Settings of DMA

In addition to the writing operation with respect to source address register 10, destination address register 11, DMA transfer counter 12 and DMA request selecting register 13 described in the conventional case, DMA is set when an external CPU (not shown) writes values to bus access weight register 220 and bus availability weight register 230. It is noted that the writing timing with respect to bus access weight register 220 and bus availability weight register 230 is the same as in FIG. 5, and therefore detailed description will not be repeated.

(2) Start of DMA

When DMA request detecting portion 60 asserts dmrq at the rise of a signal corresponding to a bit of DMA request selecting register 13 in which "1" is set among DMAREQ signals 120, DMA transfer is started.

(3) Execution of DMA

Figure 12:
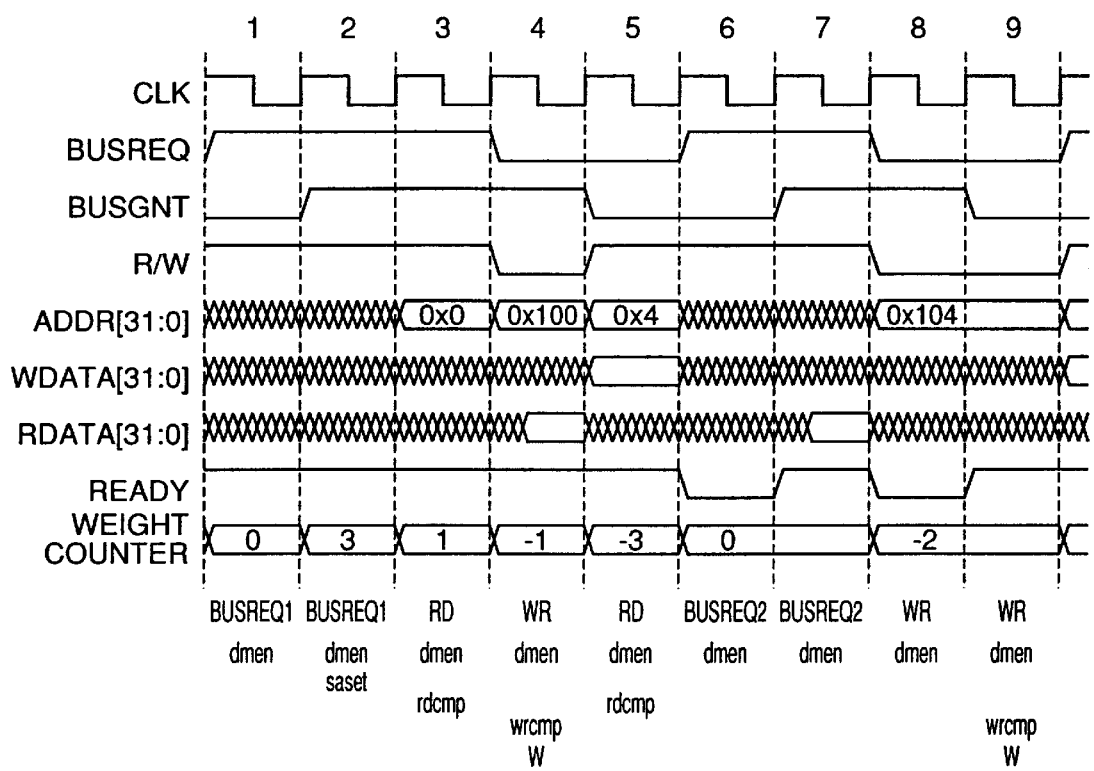
FIG. 12 is a timing chart of the DMA controller according to the third embodiment of the present invention.

When DMA request detecting portion 60 asserts dmrq, DMA controlling portion 50 executes DMA transfer. FIG. 12 is a timing chart of the DMA controller during DMA transfer. Note that "0x0" is set in source address register 10, "0x100" in destination address register 11, "0x10" in DMA transfer counter 12, "2" in bus access weight register 220, and "3" in bus availability weight register 230.

Although not shown in FIG. 12, cycle 0 corresponds to an IDLE state as in the conventional case. In cycle 0, DMA request detecting portion 60 asserts dmrq, so that FSM 254 asserts dmack and is brought into a BUSREQ1 state. At the time, the values of source address register 10, destination address register 11 and DMA transfer counter 12 are respectively set in source address counter 251, destination address counter 252 and transfer counter 253, and "0" is set in bus access weight counter 240.

In a cycle 1 (BUSREQ1 state), FSM 254 asserts dmen. Bus access request controlling portion 72 asserts BUSREQ signal 130 since dmen is asserted and bus access weight counter 240 has a value of 0. BUSGNT signal 131 is negated and READY signal 114 is asserted, so that the value of bus availability weight register 230 is added to the value of bus access weight counter 240.

In a cycle 2 (BUSREQ1 state), BUSGNT signal and READY signal are asserted, so that FSM 254 is brought into an RD state. At the time, FSM 254 asserts saset. Address generating portion 255 detects a fact that saset has been asserted for outputting the value (0x0) of source address counter 251 to an ADDR signal 110. The value of bus access weight register 220 is subtracted from the value of bus access weight counter 240.

In a cycle 3 (RD state), BUSGNT signal and READY signal are asserted, so that FSM 254 is brought into a WR state. The value of bus access weight register 220 is subtracted from that of bus access weight counter 240. Address generating portion 255 detects a fact that rdcmp has been asserted for outputting the value (0x100) of source address counter 252 to ADDR signal 110.

In a cycle 4 (WR state), FSM 254 sets R/W signal 111 in the writing state. FSM 254 is brought into the RD state since BUSGNT 131 and the READY signal are asserted. Write data generating portion 256 captures the value of RDATA signal 113. In addition, since dmen is asserted and bus access weight counter 240 has a negative value, bus access request controlling portion 72 negates BUSREQ signal 130. The value of bus access weight register 220 is subtracted from that of bus access weight counter 240.

In a cycle 5 (RD state), READY signal is asserted and BUSGNT signal is negated, so that FSM 254 is brought into a BUSREQ2 state. At the time, FSM 254 asserts rdcmp so that the value of source address counter 251 is increased by 4. Write data generating portion 256 outputs data captured in cycle 4 to WDATA signal 112. Further, since BUSGNT signal 131 is negated and READY signal 114 is asserted, the value of bus availability weight register 230 is added to that of bus access weight counter 240.

In a cycle 6 (BUSREQ2 state), since bus access weight counter 240 has a value of 0, BUSREQ signal is asserted. In a cycle 7 (BUSREQ2 state), READY signal and BUSGNT signal are asserted, so that FSM 254 is brought into the WR state. At the time, write data generating portion 256 captures the value of RDATA signal 113. Further, the value of bus access weight register 220 is subtracted from that of bus access weight counter 240.

In a cycle 8 (WR state), bus access weight counter 240 has a negative value, bus access request controlling portion 72 negates BUSREQ signal 130. Further, FSM 254 sets R/W signal 111 in the writing state. In a cycle 9 (WR state), READY signal 114 is asserted, so that output of ADDR signal 110 is stopped.

As described above, three bus accesses by DMA controlling portion 50 correspond to two bus accesses by another bus master, providing a bus access ratio of DMA controlling portion 50 of ⅗. If M and N are respectively set in bus access weight register 220 and bus availability weight register 230, the bus access ratio of DMA controlling portion 50 would be N/(M+N).

Thus, according to the DMA controller of the present embodiment, the ratio of the bus accesses by DMA controlling portion 50 to the bus accesses by another bus master can be determined in accordance with the values set in bus access weight register 220 and bus availability weight register 230, so that a band which allows another bus master to use a bus during DMA transfer can be easily predicted. A higher bus access ratio for DMA transfer with high urgency can prevent a loss of transfer data, whereby the performance of a system as a whole can be enhanced.

Fourth Embodiment

Figure 13:
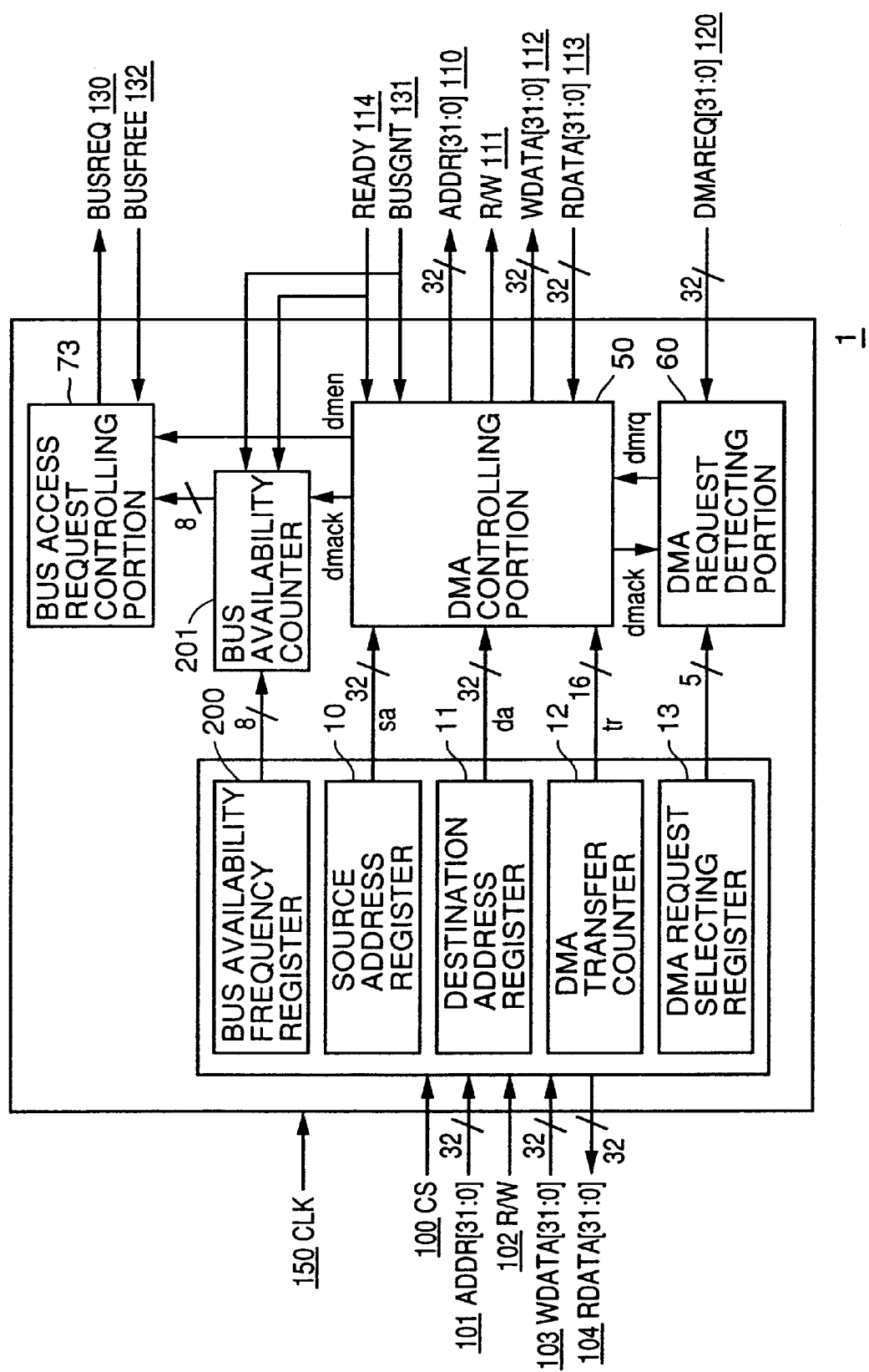
FIG. 13 is a block diagram showing a general structure of a DMA controller according to the fourth embodiment of the present invention.

FIG. 13 is a block diagram used for describing a general structure of a DMA controller according to the fourth embodiment of the present invention. The DMA controller of the present embodiment is different from that of the first embodiment shown in FIG. 7 only in the function of the bus access request controlling portion. Thus, detailed description of overlapping portions of the structure and function will not be repeated. Note that the bus access request controlling portion is denoted by a reference numeral 73.

Bus access request controlling portion 73 asserts BUSREQ signal 130 in cycles when dmen is asserted by DMA controlling portion 50 and bus availability counter 201 has a value of "0x0." In all the other cycles, bus access request controlling portion 73 negates BUSREQ signal 130. Note that bus access request signal 130 is asserted if dmen is asserted regardless of the value of bus availability counter 201 in a cycle following that in which bus freedom information signal 132 is asserted by a bus arbiter (not shown).

(1) Settings of DMA

The same as in the first embodiment, and therefore detailed description will not be repeated.

(2) Start of DMA

The same as in the first embodiment, and therefore detailed description will not be repeated.

(3) Execution of DMA

Figure 14:
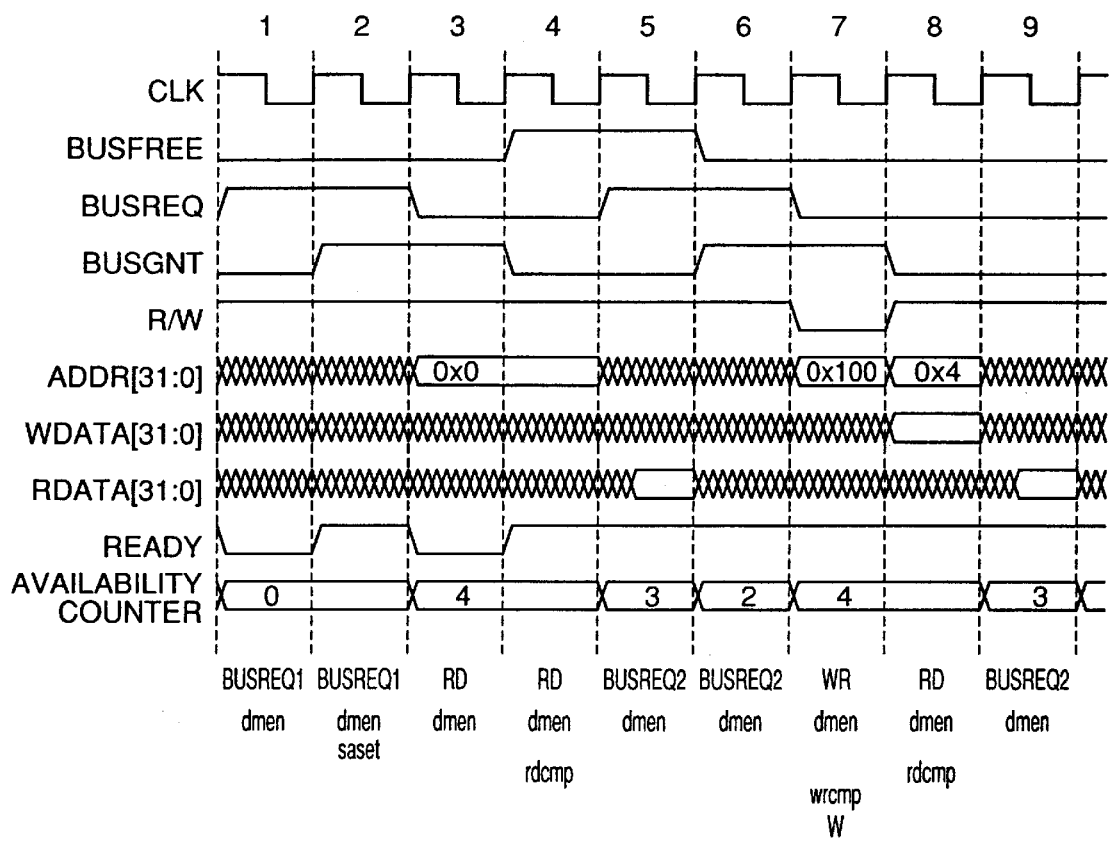
FIG. 14 is a timing chart of the DMA controller according to the fourth embodiment of the present invention.

When DMA request detecting portion 60 asserts dmrq, DMA controlling portion 50 executes DMA transfer. FIG. 14 is a timing chart of the DMA controller during DMA transfer. Note that "0x0" is set in source address register 11, "0x100" in destination address register 11, and "4" in bus availability frequency register 200.

Although not shown in FIG. 14, cycle 0 correspond to anIDLE state as in the conventional case. In cycle 0, DMA request detecting portion 60 asserts dmrq, so that FSM 254 asserts dmack and is brought into a BUSREQ1 state. At the time, the values of source address register 10, destination address register 11 and DMA transfer counter 12 are respectively set in source address counter 251, destination address counter 252 and transfer counter 255, and "0×0" is set in bus availability counter 201.

In a cycle 1 (BUSREQ1 state), FSM 254 asserts dmen. Bus access request controlling portion 73 asserts BUSREQ signal 130 since dmen is asserted and bus availability counter 201 has a value of "0×0." In a cycle 2 (BUSREQ1 state), BUSGNT signal and READY signal are asserted, so that FSM 254 is brought into an RD state. At the time, FSM 254 asserts saset. Address generating portion 255 detects a fact that saset has been asserted for outputting the value (0×0) of source address counter 251 to ADDR signal 110. Further, "4" of bus availability frequency register 200 is set in bus availability counter 201.

In a cycle 3 (RD state), FSM 254 is maintained in the RD state because READY signal is not asserted although BUSGNT signal is asserted. Since dmen is asserted and bus availability counter 201 has a positive value, bus access request controlling portion 73 negates BUSREQ signal 130.

In a cycle 4 (RD state), FSM 254 is brought into a BUSREQ2 state because BUSGNT signal is negated although READY signal is asserted. At the time, "1" is subtracted from the value of bus availability counter 201 because the value of bus access frequency counter 201 is not "0×0." FSM 254 asserts rdcmp, so that source address counter 251 is increased by 4. Address generating portion 255 detects a fact that rdcmp has been asserted to stop outputting ADDR signal 110. BUSFREE signal is asserted in this cycle 4, so that bus access request controlling portion 73 asserts BUSREQ signal 130.

In a cycle 5 (BUSREQ2 state), write data generating portion 256 detects a fact that READY has been asserted and captures the value of RDATA signal 113.

In a cycle 6 (BUSREQ2 state), BUSGNT signal and READY signal are asserted, so that FSM 254 is brought into the WR state. At the time, address generating portion 255 outputs a value of (0×100) of destination address counter 252 to ADDR signal 110. Further, the value of bus availability frequency register 200 is set in bus availability counter 201.

In a cycle 7 (WR state), FSM 254 is brought into the RD state since BUSGNT signal and READY signal are asserted and sets R/W signal 111 in the writing state. Bus availability counter 201 has a positive value, so that bus access request controlling portion 73 negates BUSREQ signal 130.

In a cycle 8 (RD state), READY signal is asserted and BUSGNT signal is negated, so that FSM 254 is brought into the BUSREQ2 state. At the time, FSM 254 asserts rdcmp, whereby the value of destination address counter 252 is increased by 4 and the value of transfer counter 253 is decreased by 1. Then, address generating portion 255 detects a fact that wrcmp has been asserted and stops outputting ADDR signal 110.

In a cycle 9 (BUSREQ2 state), write data generating portion 256 detects a fact that READY signal has been asserted and captures the value of RDATA signal 113. At the time, since bus availability counter 201 does not have a value of "0×0," the value of bus availability counter 201 is decreased by 1.

As described above, when there is no bus access request from another bus master, DMA controlling portion 50 can accomplish bus access regardless of the set bus access ratio.

As in the foregoing, according to the DMA controller of the present embodiment, DMA controlling portion 50 can accomplish access when there is no bus access request from another bus master regardless of the value set in bus availability frequency register 200, so that the performance of a system as a whole can be enhanced.

Fifth Embodiment

Structure of DMA Controller

Figure 15:
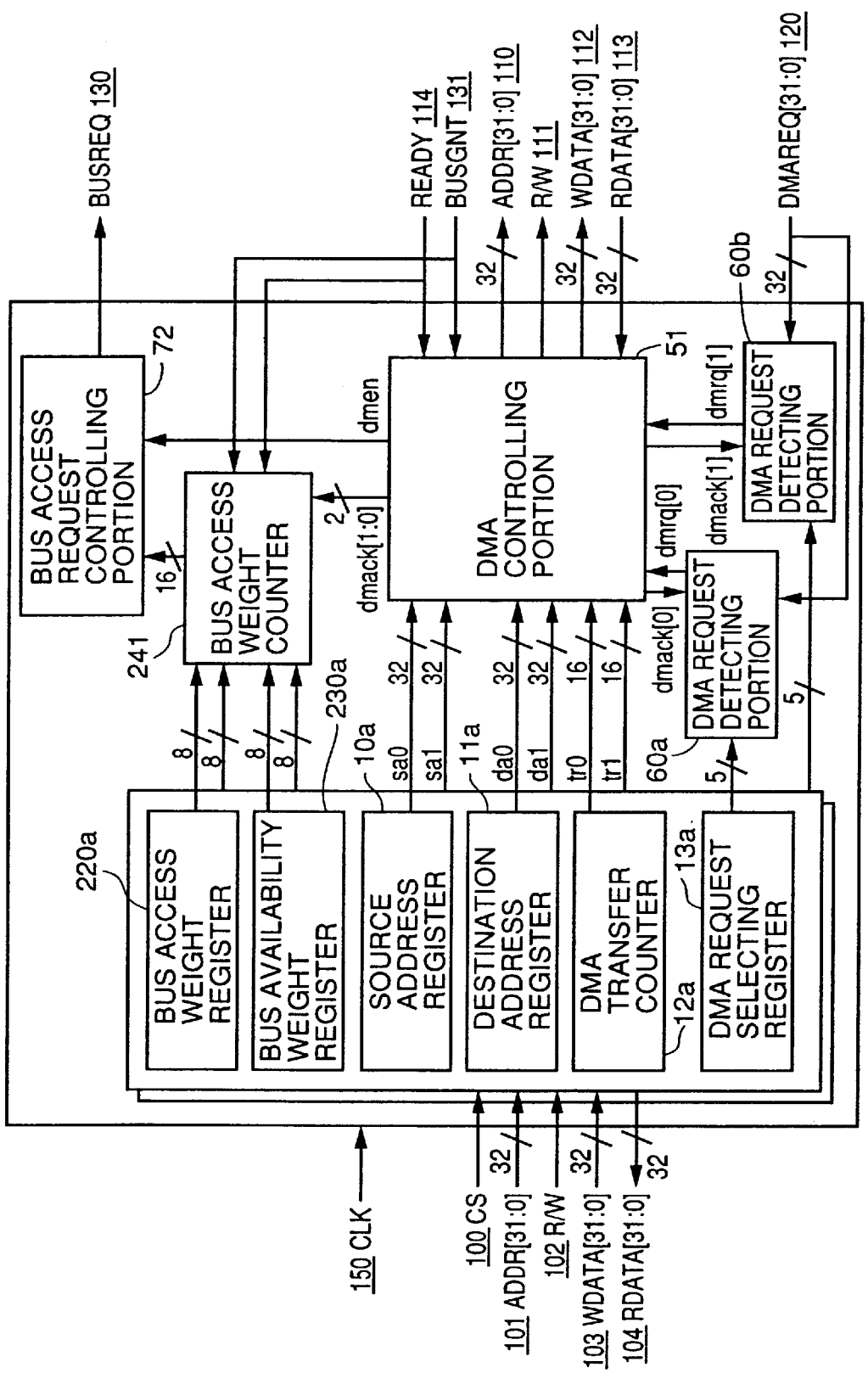
FIG. 15 is a block diagram showing a general structure of a DMA controller according to the fifth embodiment of the present invention.

FIG. 15 is a block diagram used for describing a general structure of a DMA controller according to the fifth embodiment of the present invention. The DMA controller of the present embodiment is different from that of the third embodiment shown in FIG. 11 in that each of source address register 10, destination address register 11, DMA transfer counter 12, DMA request selecting register 13, DMA request detecting portion 60, bus access weight register 220 and bus availability weight register 230 is provided for two channels (channels 1 and 2) and in the functions of DMA controlling portion and bus access weight counter. Accordingly, detailed description of overlapping portions of the structure and function will not be repeated. Note that the portion for a channel 0 is denoted by a reference character a and that for channel 1 by reference character b. The DMA controlling portion and bus access weight counter are respectively denoted by reference numerals 51 and 241.

When dmack [0] or dmack [1] is asserted by DMA controlling portion 51, "0×0" is set in bus access weight counter 241. At the time, information indicating as to if DMA is for channel 0 or channel 1 is stored in an internal register (not shown). When the information stored in the internal register indicates channel 0, BUSGNT signal is asserted and, when READY signal 114 is asserted, the value of bus access weight register 220a is subtracted from that of bus access weight counter 241. When BUSGNT signal 131 is negated and READY signal 114 is asserted, the value of bus availability weight register 230a is added to that of bus access weight counter 241.

If the information stored in the internal register indicates channel 1, the value of bus access weight register 220b is subtracted from that of bus access weight counter 241 when BUSGNT signal and READY signal 114 are asserted. The value of bus availability weight register 230b is added to the value of bus access weight counter 241 when BUSGNT signal 131 is negated and READY signal 114 is asserted.

Figure 16:
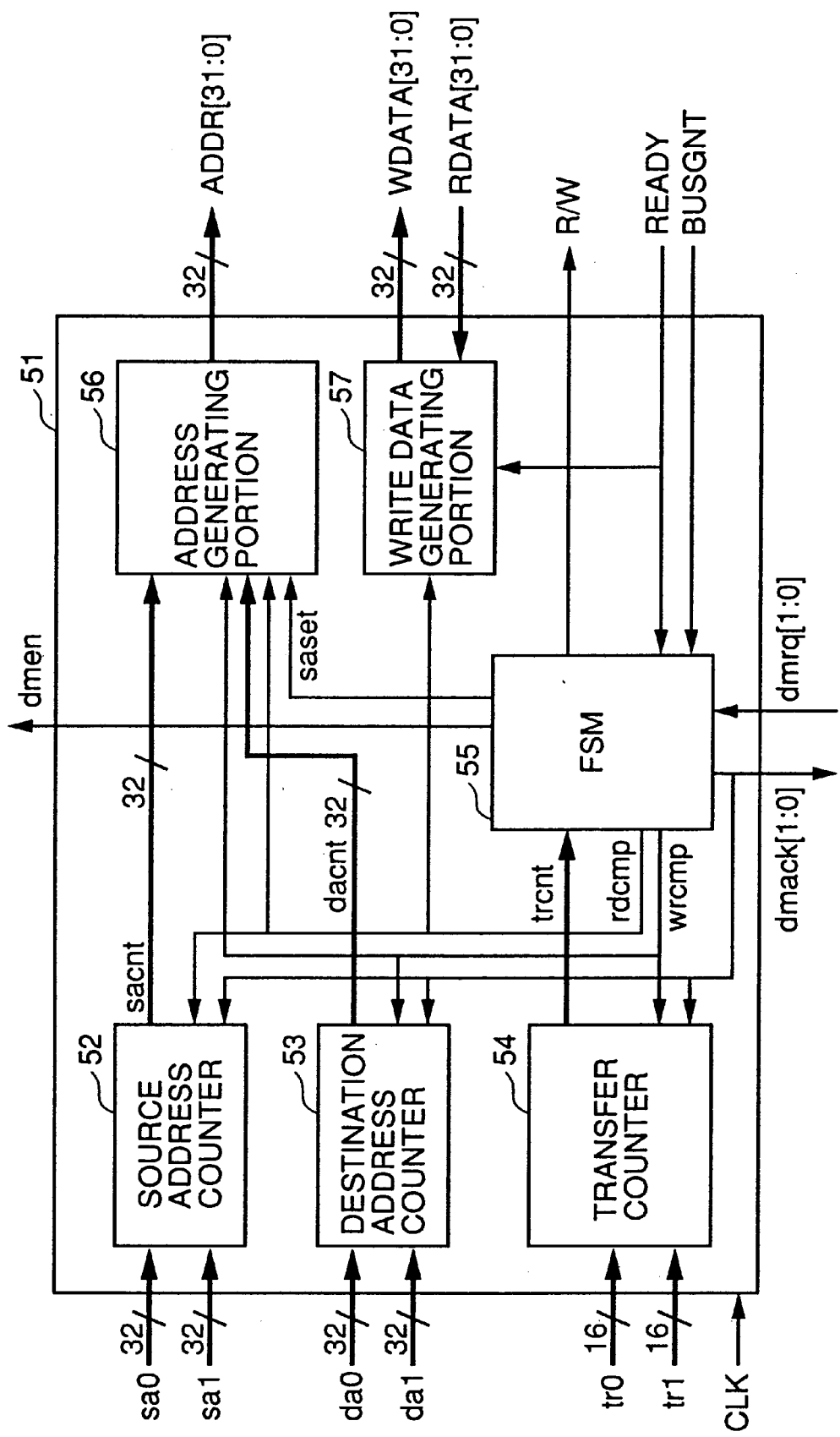
FIG. 16 is a block diagram used for describing the structure of DMA controlling portion 51 in greater detail.

FIG. 16 is a block diagram used for describing the structure of DMA controlling portion 51 in greater detail. DMA controlling portion 51 includes: a source address counter 52 of a 32-bit counter calculating a source address; a destination address counter 53 of a 32-bit counter calculating a destination address; a transfer counter 54 of a 16-bit counter calculating an amount of data transferred; an FSM 55 generating and outputting a control signal in accordance with the status of data transfer by DMA; an address generating portion 56 generating and outputting an ADDR signal 110 from outputs of source address counter 52 and destination address counter 53; and a write data generating portion 57 generating and outputting WDATA signal 112.

When dmack [0] is asserted, a value of source address register 10a for channel 0 is set in source address counter 52. When dmack [1] is asserted, the value of source address register 10b for channel 1 is set. Then, the value of source address counter 52 is increased by 4 when rdcmp is asserted, but source address counter 52 maintains the current value in all the other cycles.

When dmack [0] is asserted, the value of destination address register 11a for channel 0 is set in destination address counter 53. When dmack [1] is asserted, the value of destination address register 11*b* for channel 1 is set. Then, the value of destination address counter 53 is increased by 4 when wrcmp is asserted, but destination address counter 53 maintains the current value in all the other cycles.

Figure 1:
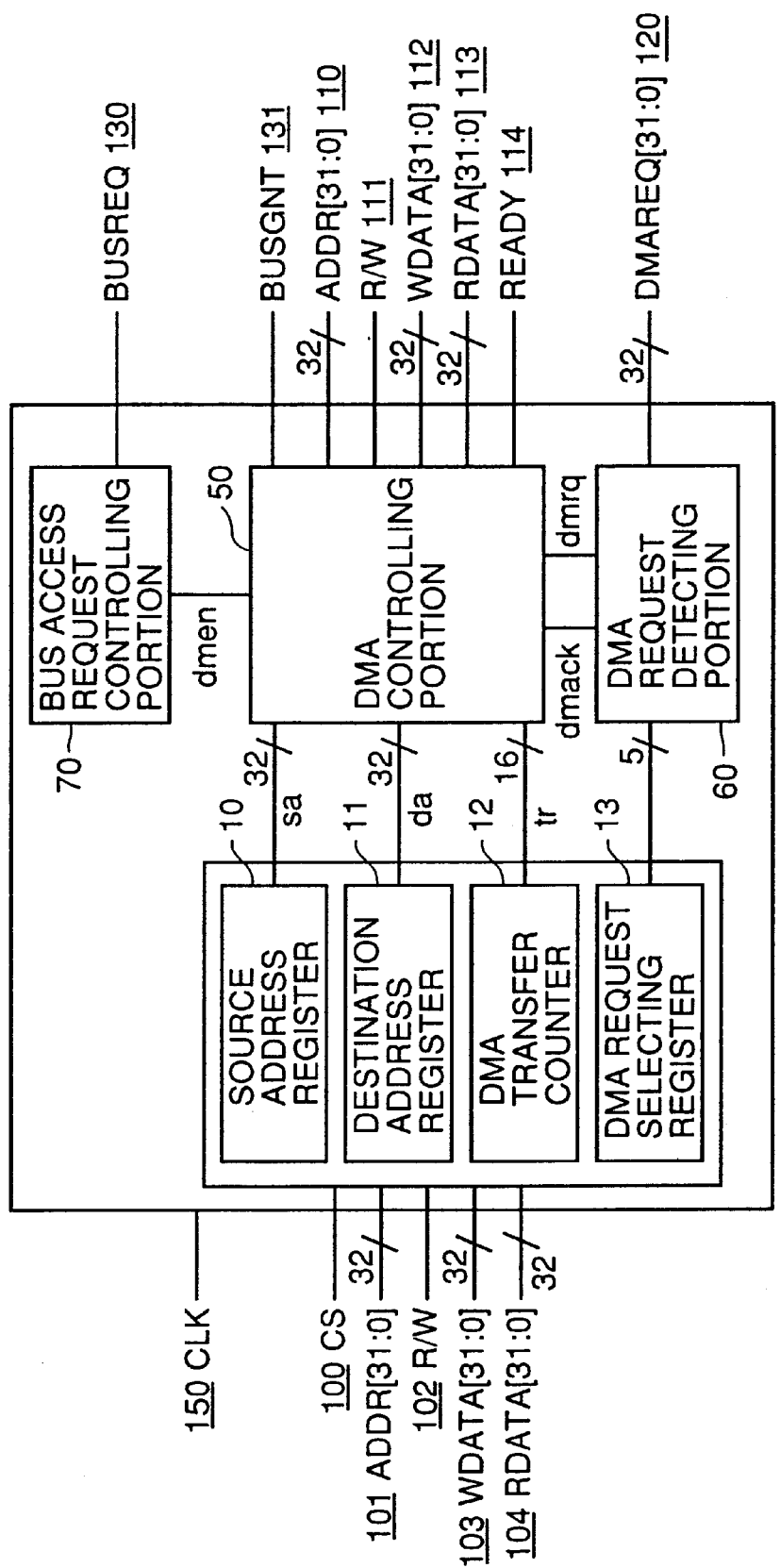
FIG. 1 is a block diagram showing a general structure of a conventional DMA controller.
Figure 2:
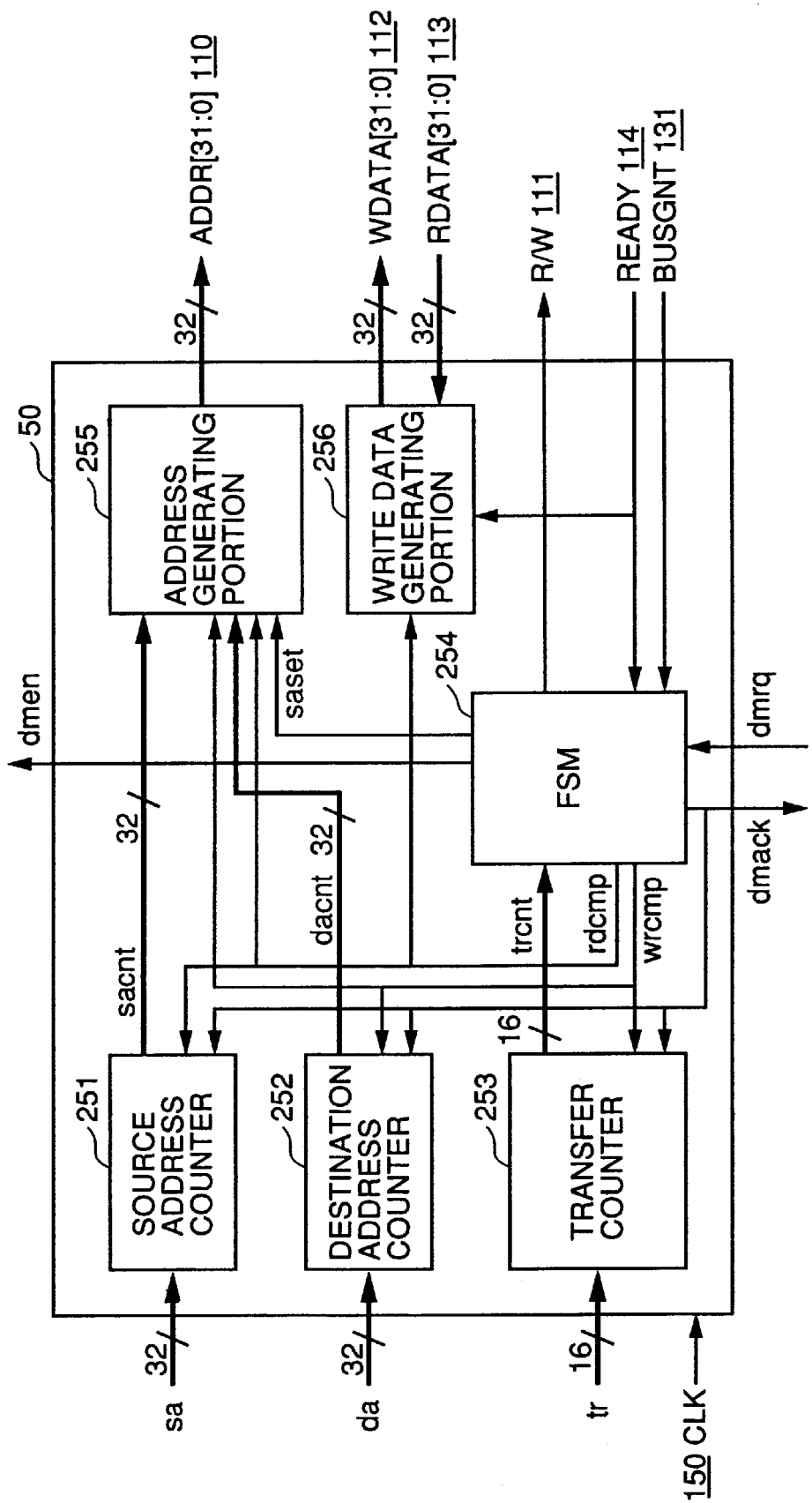
FIG. 2 is a block diagram used for describing the structure of DMA controlling portion 50 in greater detail.
Figure 3:
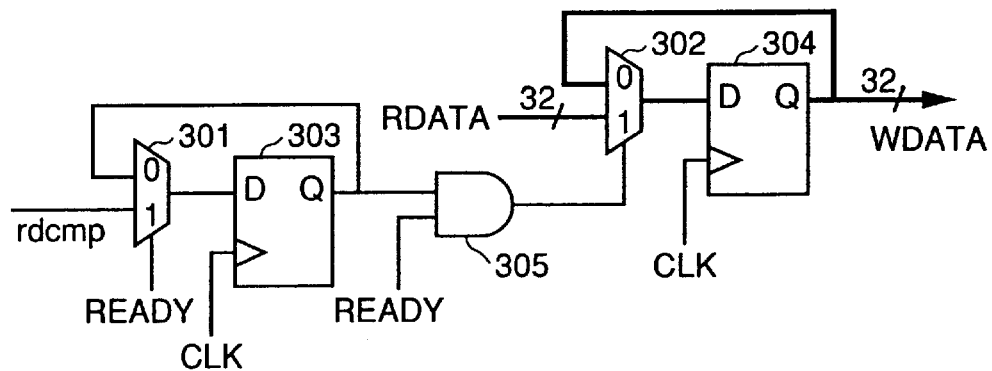
FIG. 3 is a block diagram used for describing the structure of write data generating portion 256 in greater detail.

When dmack [0] is asserted, the value of DMA transfer counter 12*a* for channel 0 is set in transfer counter 54. When dmack [1] is asserted, the value of DMA transfer counter 12*b* for channel 1 is set. Then, the value of transfer counter 54 is decreased by 1 when wrcmp is asserted, but transfer counter 54 maintains the current value in all the other cycles. Note that address generating portion 56 and the write data generating portion 57 have functions which are the same as those of address generating portion 255 and write data generating portion 256 shown in FIG. 2, and therefore detailed description thereof will not be repeated.

Figure 4:
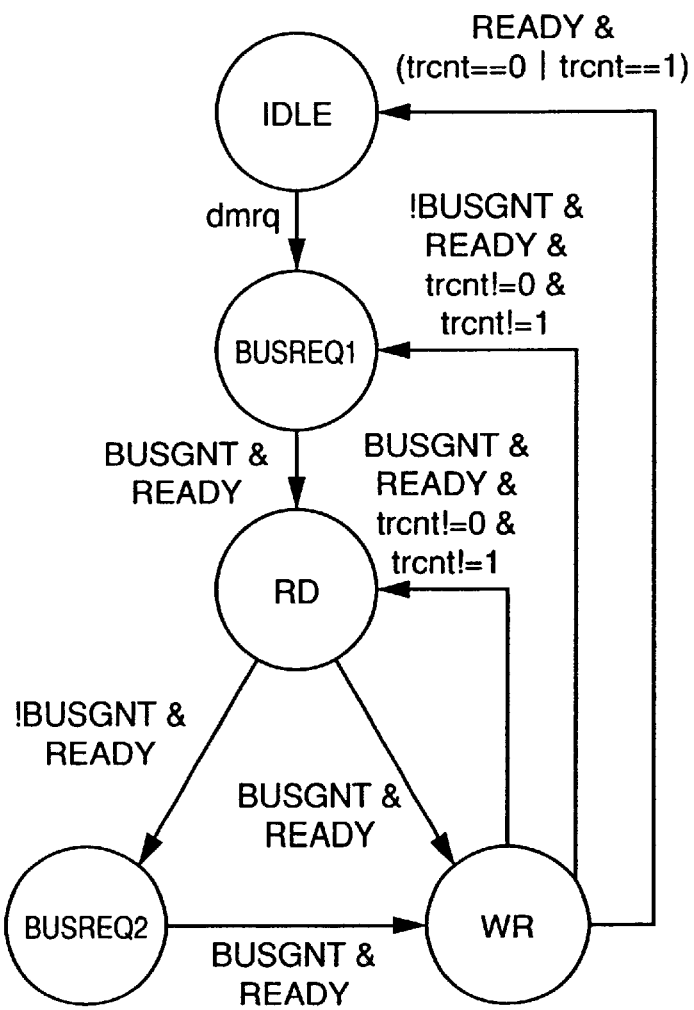
FIG. 4 is a diagram showing state transitions of FSM 254.
Figure 17:
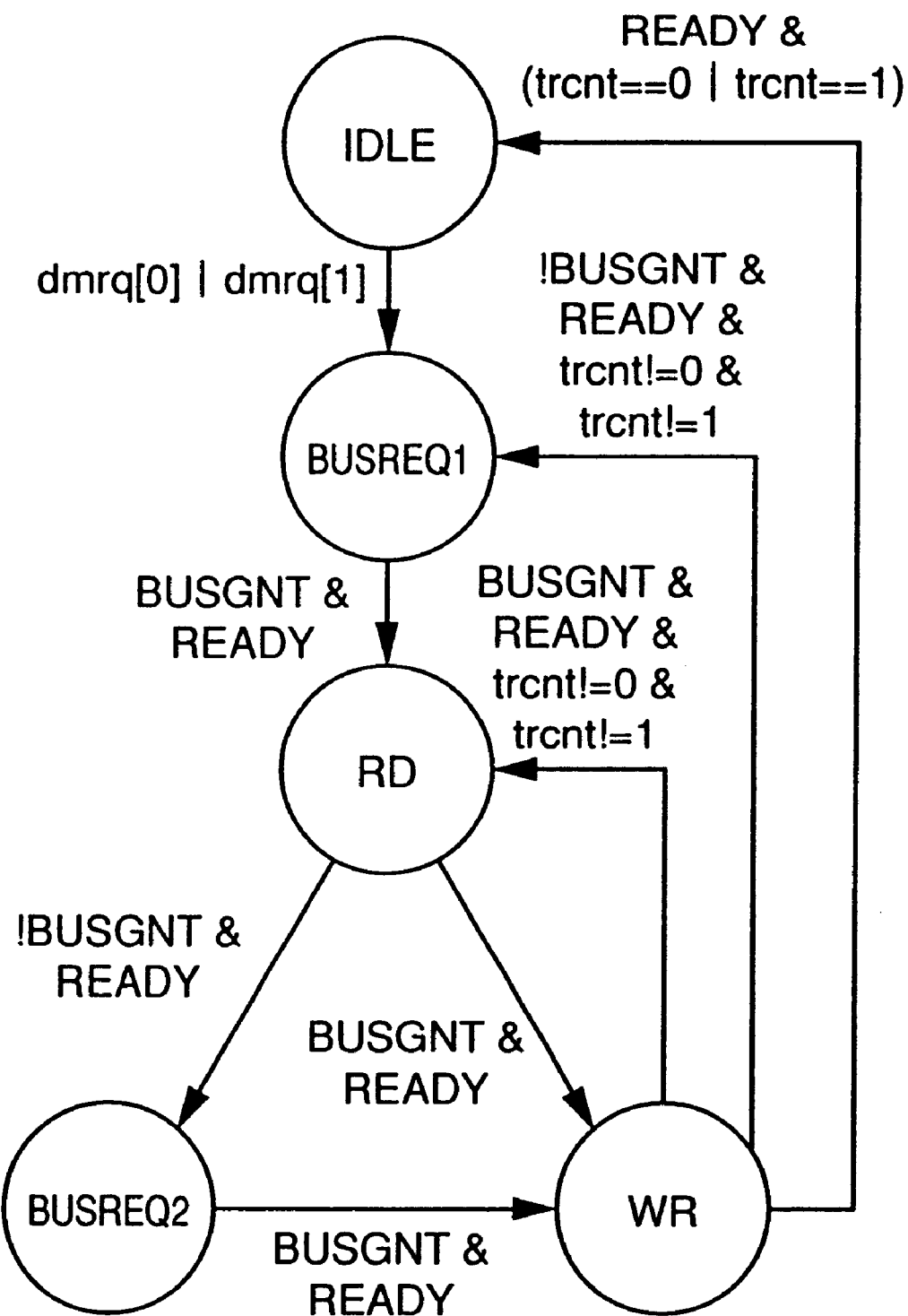
FIG. 17 is a diagram showing state transitions of FSM 55.

FIG. 17 is a diagram showing state transitions of FSM 55. FSM 55 differs from FSM 254 shown in FIG. 4 in that it is brought into the BUSREQ1 state if dmrq [0] or dmrq [1] is asserted in the IDLE state. FSM 55 outputs two dmacks, i.e., dmack [0] for channel 0 and dmack [1] for channel 1, and asserts dmack [0] if dmrq [0] is asserted and asserts dmack [1] if dmrq [0] is not asserted but dmrq [1] is asserted in the IDLE state.

Operation of DMA Controller (1) Settings of DMA

DMA is set when a CPU (not shown) writes values to source address registers 10*a* and 10*b*, destination address registers 11*a* and 11*b*, DMA transfer counters 12*a* and 12*b*, DMA request selecting registers 13*a* and 13*b*, bus access weight registers 220*a* and 220*b*, and bus availability weight registers 230*a* and 230*b*. Note that the writing timing with respect to each register is the same as in the case of FIG. 5, and therefore detailed description thereof will not be repeated.

(2) Start of DMA

DMA transfer starts when DMA request detecting portion 60*a* or 60*b* asserts dmrq [0] or dmrq [1] at the rise of a signal corresponding to the bit of DMA request selecting register 13*a* or 13*b* in which "1" is set among DMAREQ signals 120.

(3) Execution of DMA

When DMA request detecting portion 60*a* or 60*b* asserts dmrq [0] or dmrq [1], DMA controlling portion 51 executes DMA transfer. Note that the timing chart of the DMA controller of the present embodiment is different from that of the third embodiment shown in FIG. 12 only in that it corresponds to dmrq [0] for channel 0 or dmrq [1] for channel 1, but the timings are the same. Therefore, detailed description will not be repeated.

As described above, the bus access ratios of the channels can be set by setting values in registers for channel 0 and channel 1. If M0 and M1 are respectively set in bus access frequency weight registers 220*a* and 220*b* and N0 and N1 are respectively set in bus availability weight registers 230*a* and 230*b*, the bus access ratios of the channels by DMA controlling portion 51 would be N0/(M0+N0) and N1/(M1+N1).

As in the foregoing, according to the DMA controller of the present embodiment, a ratio of the bus access frequency of DMA controlling portion 51 to the bus access frequency of another bus master can be determined in accordance with the value set in the register of each channel, so that a band which allows another bus master to use a bus during DMA transfer can be easily predicted. In addition, a higher bus access ratio for DMA transfer with high urgency can prevent a loss of transfer data, so that the performance of a system as a whole can be enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A direct memory access controller, comprising:
    a register setting a ratio of a bus access frequency of direct memory access transfer to a bus access frequency of another bus master;
    a direct memory access request detecting portion detecting a direct memory access request;
    a counter counting a bus access frequency in accordance with said ratio set in said register;
    a bus access request controlling portion controlling a bus access request based on said direct memory access request detected by said direct memory access request detecting portion and the counted result of said counter; and
    a direct memory access controlling portion controlling execution of direct memory access transfer in accordance with a bus access grant.

2. The direct memory access controller according to claim 1, wherein said register includes a bus availability frequency register setting said bus access frequency of said another bus master, and
    said counter includes a bus availability counter counting said bus access frequency of said another bus master in accordance with a value set in said bus availability frequency register.

3. The direct memory access controller according to claim 2, wherein said bus access request controlling portion outputs the bus access request in such a way that a ratio of a bus access frequency of said direct memory access controlling portion to said bus access frequency of said another bus master is 1:N, where said value set in said bus availability frequency register is a positive integer N.

4. The direct memory access controller according to claim 2, wherein said register further includes a bus access frequency register setting said bus access frequency of said direct memory access controlling portion, and
    said counter further includes a bus access counter counting said bus access frequency of said direct memory access controlling portion in accordance with said value set in said bus access frequency register.

5. The direct memory access controller according to claim 4, wherein said bus access request controlling portion outputs the bus access request in such a way that a ratio of said bus access frequency of said direct memory access controlling portion to said bus access frequency of said another bus master is M:N, where said value set in said bus access frequency register is a positive integer M and said value set in said bus availability frequency register is a positive integer N.

6. The direct memory access controller according to claim 1, wherein said register includes
    a bus access weight register setting a weight of bus access by said direct memory access controlling portion, and
    a bus availability weight register setting a weight of bus access by said another bus master, and said counter includes
    a bus access weight counter adding or subtracting values set in said bus access weight register and said bus availability weight register.

7. The direct memory access controller according to claim 6, wherein said bus access weight counter subtracts the value set in said bus access weight register every time the bus access by said direct memory access controlling portion is detected and adds said value set in said bus availability weight register every time the bus access by said another bus master is detected, and said bus access request controlling portion asserts said bus access request when said value of said bus access weight counter is at least 0, and negates said bus access request when said bus access weight counter has a negative value.

8. The direct memory access controller according to claim 1, wherein said bus access request controlling portion inputs bus freedom information indicating absence of a bus access request from another bus master, and asserts said bus access request when said bus freedom information is asserted.

9. The direct memory access controller according to claim 1, wherein said register includes registers for a plurality of channels each setting a ratio of a bus access frequency of direct memory access transfer to a bus access frequency of another bus master, and said counter includes a bus access weight counter adding and subtracting values in accordance with bus access of a channel executing direct memory access transfer of said plurality of channels and bus access by said another bus master.

10. A direct memory access transfer method, comprising the steps of:

setting a ratio of a bus access frequency of direct memory access transfer to a bus access frequency of another bus master;

detecting a direct memory access request;

counting a bus access frequency in accordance with said set ratio;

controlling a bus access request based on said detected direct memory access request and said counted result; and controlling execution of direct memory access transfer in accordance with a bus access grant.

11. The direct memory access transfer method according to claim 10, wherein said step of setting said ratio includes the step of setting a bus access frequency of said another bus master, and said step of counting said bus access frequency includes the steps of counting said bus access frequency of said another bus master in accordance with said set bus access frequency of said another bus master.

12. The direct memory access transfer method according to claim 11, wherein said step of controlling said bus access request includes the step of outputting the bus access request in such a way that said ratio of said bus access frequency of said direct memory access transfer to said bus access frequency of said another bus master is 1:N, where said set bus access frequency of said another bus master is a positive integer N.

13. The direct memory access transfer method according to claim 11, wherein said step of setting said ratio includes the step of setting said bus access frequency of said direct memory access transfer, and said step of counting said bus access frequency further includes the step of counting said bus access frequency of said direct memory access transfer in accordance with said set bus access frequency of said direct memory access transfer.

14. The direct memory access transfer method according to claim 13, wherein said step of controlling said bus access request includes the step of outputting the bus access request in such a way that said bus access frequency of direct memory access transfer to said bus access frequency of said another bus master is M:N, where said set bus access frequency of said direct memory access transfer is a positive integer M and said set bus access frequency of said another bus master is a positive integer N.

15. The direct memory access transfer method according to claim 10, wherein said step of setting said ratio includes the steps of:

setting a weight of bus access by said direct memory access transfer, and setting a weight of bus access by said another bus master, and said step of counting said bus access frequency includes the step of adding or subtracting said set weights of bus accesses by said direct memory access transfer and said bus master.

16. The direct memory access transfer method according to claim 15, wherein said step of adding or subtracting said set weights of bus accesses by said direct memory access transfer and said bus master includes the step of subtracting said set weight of said bus access by said direct memory access transfer every time said bus access by said direct memory access transfer is detected and adding said set weight of said bus access by said another bus master every time said bus access by said another bus master is detected, and said step of controlling said bus access request asserts said bus access request when a weight of said bus access by said direct memory access transfer after said subtraction is at least 0, and negates said bus access request when a weight of said bus access by said direct memory access transfer after said subtraction has a negative value.

17. The direct memory access transfer method according to claim 10, wherein said step of controlling said bus access request includes the step of inputting bus freedom information indicating absence of a bus access request from another bus master and asserting said bus access request when said bus freedom information is asserted.

18. The direct memory access transfer method according to claim 10, wherein said step of setting said ratio includes the step of setting, for each of a plurality of channels, a ratio of bus access frequency of direct memory access transfer to bus access frequency of another bus master, and said step of counting said bus access frequency includes the step of adding or subtracting values in accordance with bus access of a channel executing said direct memory access transfer of said plurality of channels and bus access of said another bus master.

* * * * *